US010664601B2

United States Patent
Wang et al.

(10) Patent No.: US 10,664,601 B2
(45) Date of Patent: May 26, 2020

(54) METHOD AND SYSTEM AUTOMATIC BUFFER OVERFLOW WARNING INSPECTION AND BUG REPAIR

(71) Applicant: Nanjing University, Nanjing (CN)

(72) Inventors: Linzhang Wang, Nanjing (CN); You Li, Nanjing (CN); Xuandong Li, Nanjing (CN)

(73) Assignee: Nanjing University, Nanjing, Jangsu (CN)

( * ) Notice: Subject to any disclaimer, the term of this patent is extended or adjusted under 35 U.S.C. 154(b) by 139 days.

(21) Appl. No.: 15/333,445

(22) Filed: Oct. 25, 2016

(65) Prior Publication Data
US 2018/0114026 A1 Apr. 26, 2018

(51) Int. Cl.
*G06F 21/57* (2013.01)
*G06F 11/36* (2006.01)

(52) U.S. Cl.
CPC ........ *G06F 21/577* (2013.01); *G06F 11/3604* (2013.01); *G06F 11/3624* (2013.01); *G06F 2221/033* (2013.01)

(58) Field of Classification Search
CPC .............. G06F 21/577; G06F 11/3624; G06F 2221/033
USPC .......................................................... 726/25
See application file for complete search history.

(56) References Cited

U.S. PATENT DOCUMENTS

| | | | | |
|---|---|---|---|---|
| 2008/0244536 | A1* | 10/2008 | Farchi ..................... | G06F 8/433 717/130 |
| 2008/0276025 | A1* | 11/2008 | Cherem .................. | G06F 9/524 710/200 |
| 2010/0058475 | A1* | 3/2010 | Thummalapenta ... | G06F 21/577 726/25 |
| 2012/0084759 | A1* | 4/2012 | Candea ............... | G06F 11/3612 717/126 |
| 2012/0151449 | A1* | 6/2012 | Maeda ...................... | G06F 8/74 717/126 |

(Continued)

OTHER PUBLICATIONS

Tao et al , An Empirical Study on Detecting and Fixing Buffer Overflow Bugs, Jul. 21, 2016, IEEE , p. 91-101.*

(Continued)

*Primary Examiner* — Alexander Lagor
*Assistant Examiner* — Moeen Khan
(74) *Attorney, Agent, or Firm* — Duane Morris LLP

(57) ABSTRACT

A system for automatic buffer overflow warning inspection and bug repair is disclosed. The system includes a first module for warning reachability analysis, the first module accepts static overflow warnings and source code as an input, the first module is functionally connected to the second and the third modules, and sends out a warning path set as an output. The system also includes a second module for guided symbolic execution, the second module is functionally connected to the first module and the third module. The system further includes a third module for buffer overflow validation, the third module is functionally connected to the first, the second and the four modules and sends out undecided warnings and false warnings as output. The system further includes a fourth module for targeted automatic repair, the fourth module is functionally connected to the third module and sends out true warnings as output.

13 Claims, 8 Drawing Sheets

(56) References Cited

U.S. PATENT DOCUMENTS

| | | | | |
|---|---|---|---|---|
| 2013/0326485 A1* | 12/2013 | Ghosh | ............... | G06F 8/313 |
| | | | | 717/126 |
| 2015/0178183 A1* | 6/2015 | Tripp | ............... | G06F 11/3684 |
| | | | | 717/123 |
| 2015/0339217 A1* | 11/2015 | Avgerinos | ............... | G06F 11/3608 |
| | | | | 717/132 |
| 2018/0046564 A1* | 2/2018 | Muske | ............... | G06F 11/3604 |
| 2018/0046934 A1* | 2/2018 | Aravkin | ............... | G06N 99/005 |

OTHER PUBLICATIONS

Yang et al, Improving Accuracy of Static Integer Overflow Detection in Binary, Dec. 2015, pp. 247-269 (Year: 2015).*

Li et al., "Automatic Buffer Overflow Warning Inspection and Bug Repair," Jun. 28, 2016, 12pgs.

* cited by examiner

```
1  # define MAX_LEN 24
2  # define MIN_LEN 4
3  void usage () {
4      char des_buffer[MIN_LEN];
5      char* src_buffer="this is an example";
6      strcpy( des_buffer, src_buffer);
7  }
8  void initialize( char* argv_string) {
9      char mapped_argv[MIN_LEN];
10     if( strlen(argv_string) == 0)
11         return;
12     if( strlen(argv_string) >= MAX_LEN)
13         return;
14     if(argv_string[0] != '-')
15         strcat(mapped_argv,'-');
16     strcpy(mapped_argv, argv_string);
17  }
18
19 int main (int argc, char **argv) {
20     initialize (*argv);
21     char* mode=NULL;
22     size_t mode_alloc=0;
23     size_t mode_len=0;
24     char const *arg = argv[optind - 1];
25     size_t arg_len = strlen (arg);
26     size_t new_mode_len = mode_len + arg_len;
27     if(mode_alloc <= new_mode_len) {
28         mode_alloc = new_mode_len + 1;
29         mode = (char*)x2realloc (mode, &mode_alloc);
30     }
31     strcpy (mode, arg);
32     return 0;
33 }
```

Fig. 2

Fig. 4 Warning Reachability Analysis

Fig. 5 Guided Symbolic Execution

Fig. 6 Buffer Overflow Validation

```
16 if(strlen(argv_string)>=sizeof(mapped_argv)){
17   printf("strcpy may have a buffer
     overflow, exit\n");
18   return 0;
19 }
20 strcpy(mapped_argv, argv_string);
```

Mode: Boundary Checking

```
16 strncpy(mapped_argv, argv_string,
     sizeof(mapped_argv));
```

Mode: API Replacement

Fig. 7

METHOD AND SYSTEM AUTOMATIC BUFFER OVERFLOW WARNING INSPECTION AND BUG REPAIR

BACKGROUND

Buffer overflow occurs when more data is written into a buffer than the buffer capacity, causing extra data being written into memory adjacent to the buffer. If the adjacent memory before being overwritten has stored information (such as the pointer to the previous frame and return address) that is critical for the operating system (OS) to correctly execute programs, buffer overflow may cause unpredictable behavior. In a buffer overflow attack, the attacker carefully crafts his input data to vulnerable software so that the unpredictable behavior is that the OS executes his malicious code embedded in the overflow data with the privilege of the vulnerable software.

Although more than forty years have passed since the buffer overflow technique was first documented by Anderson in 1972 and almost thirty years have passed since the buffer overflow technique was first exploited by the infamous Morris worm in 1988, buffer overflow remains the most common type of software vulnerabilities, as shown in the recent studies of software vulnerability databases, and it is likely to remain so for many years to come. First, much existing software has buffer overflow vulnerabilities, which are unknown to its vendors and users, but will be exploited by attackers sooner or later. Second, much future software will still be written by programmers who are not well trained in software security. The inherently unsafe languages C and C++ will remain popular languages for performance and backward compatibility reasons. Although it is known how to avoid buffer overflow problems in writing programs for many years, having such knowledge is far from enough to thwart the rampant buffer overflow issue.

There are two general approaches to identifying buffer overflow vulnerabilities: static program analysis and dynamic execution analysis. The static program analysis approach scans software source code discover the code segments that are possibly vulnerable to buffer overflow attacks. Each vulnerability warning needs to be manually inspected to check whether each warning is indeed a true vulnerability. The key advantage of such schemes is that buffer overflow vulnerabilities can be discovered and fixed before software deployment. The key limitation of existing such schemes is that the reported buffer overflow vulnerabilities contain too many false positives fundamentally due to the lack of software execution information (such as which code segment is reachable in execution and which execution path will be followed) and each false positive wastes a huge amount of human effort on manual source code inspection. The dynamic execution analysis approach inserts special code into software so that buffer overflow occurrences can be detected and properly processed such as terminating software execution. The key advantage of such schemes is that they rarely have false positives because they have software execution information. The key limitation of such schemes is that they incur an excessive amount of performance overhead (as much as 1,662 times slower) because the inserted code needs to be executed for each buffer operation and function call.

In order to address the limitations discussed above, BovInspector is invented, which is the first framework for automatic inspection of buffer overflow vulnerability warnings output by existing static program analysis tools.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 illustrates the sample source code of warning reachability analysis in accordance with some embodiments.

FIG. 7 is a figure illustrating the source code for API replacement in accordance with some embodiments.

DETAILED DESCRIPTION

Figure 1:
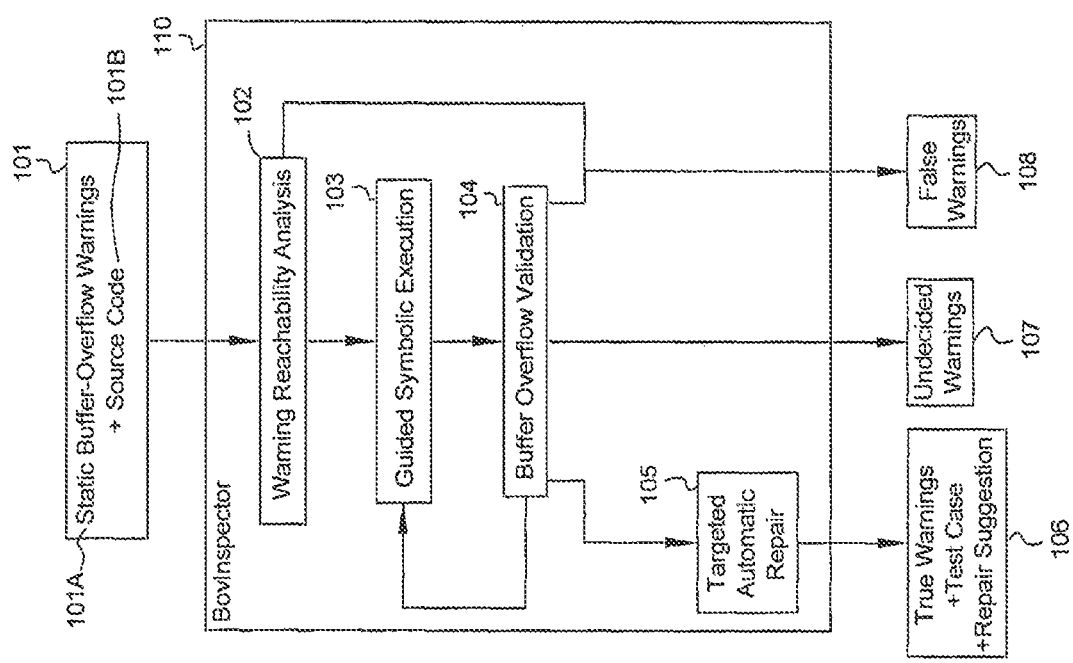
FIG. 1 is a block diagram illustrating the architecture of a BovInspector in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Various embodiments in this application are also described in details in Li et al, Automatic Buffer Overflow Warning Inspection and Bug Repair, Jun. 28, 2016, which is incorporated by reference in its entirety.

FIG. 1 is a block diagram illustrating the architecture of a BovInspector in accordance with some embodiments. According to some embodiments, BovInspector is a first framework for automatic inspection of buffer overflow vulnerability warnings output by existing static program analysis tools. The BovInspector 100 includes input 101, which further includes two components, the static buffer overflow vulnerability warnings 101A and the source code 101B. The BovInspector 110 also includes a warning reachability analysis unit 102, a guided symbolic execution unit 103, a buffer overflow validation unit 104, and a targeted automatic repair unit 105.

The BovInspector 110 further includes three outputs: the true warnings 106, the false warnings 108, and the undecided warnings 107. The true warnings 106 are those that there exists at least one test case that triggers buffer overflow. For each of the true warnings 106, BovInspector 110 also outputs such a test case. In addition, BovInspector 110 can automatically repair the vulnerabilities for validated true warnings by checking array boundaries or replacing unsafe API by safe ones. The false warnings 108 are those that there exists no test case that triggers buffer overflow or totally unreachable. For such false warnings 108, no human inspection is needed. The undecidable warnings 107 are those that BovInspector 110 can neither find a test case to trigger buffer overflow nor prove that no such test case exists within a given time limit. The optimization goal of BovInspector 110 is to minimize the number of undecided warnings. In the ideal scenario, the number of undecidable warnings is minimized to zero for all programs; however, this is theoretically impossible because that the problem of using one program to find non-trivial properties of another program is fundamentally undecided.

Prior buffer overflow vulnerability discovery schemes are mostly based on static program analysis and sometimes symbolic execution. The key contribution of BovInspector 110 is to eliminate the need to manually inspect the warnings in the false warning category, which can save a large amount of manual effort. According to some embodiments, BovInspector 110 is a necessary post processing procedure for static program analysis based buffer overflow vulnerability discovery schemes. According to some embodiments, experimental results on real open source programs show that the percentage of false warnings ranges from 25% to 100% with an average of 59:9%. According to some embodiments, a buffer overflow vulnerability warning consists of a warning point, and a large number of possible path segments. The warning point is one line of source code that buffer overflow may occur. The possible path segments are a large number of possible path segments (often in the scale of dozens), where each path segment is a sequence of m lines of code. According to some embodiments, the execution of these m lines of code may trigger buffer overflow to occur at the overflow point. According to some embodiments, saving manual effort on inspecting one buffer overflow vulnerability warning means saving manual effort on both inspecting the warning point and the path segments associated with the overflow point.

According to some embodiments, BovInspector 110 uses symbolic execution to automatically identify true buffer overflow warnings and false buffer overflow warnings. According to some embodiments, symbolic execution has the capability to explore program execution states that are not available to static program analysis. According to some embodiments, symbolic execution has the path explosion issue, i.e., the number of execution paths grows exponentially with the number branching points. According to some embodiments, to avoid path explosion, warning paths are implemented to guide the symbolic execution. According to some embodiments, only such warning paths are inspected. All executions paths that do not lead to warnings paths are pruned. According to some embodiments, BovInspector 110 includes four modules: warning reachability analysis unit 102, guided symbolic execution unit 103, buffer overflow validation unit 104, and targeted automatic repair unit 105. According to some embodiments, when the source code of a program is given, the step before BovInspector 110 is static program analysis.

The input to the warning reachability analysis module 102 is the set of buffer overflow warnings 101A together with the source code 101B. For each buffer overflow warning 101A, the warning reachability analysis module 102 outputs a set of complete paths covering all the reachable path segments of the warning, where each complete path starts from the program entrance and ends at the warning point. We call such complete paths warning paths. Note that if some path segment and warning are not reachable, they can be identified and are therefore discarded. The corresponding warnings are classified as false warnings. In this module, we first generate the Inter-procedural Control Flow Graph (ICFG) from the source code. Then, guided by the path segments from buffer overflow warnings, we perform backward tracking on the ICFG to find the set of complete paths that cover all path segments.

In the Guided Symbolic Execution module 103, we perform symbolic execution on the source code starting from the program entrance. At each branching point with k possible branches, we first make k replicates of the symbolic execution and for each replicated execution we record the corresponding branching condition; second, for each replicate of the symbolic execution, which represents a complete path from the program entrance to the branching point, if we can determine that this path will not lead to any warning path, then we eliminate this replicate. While traditional symbolic execution techniques focus on better program coverage, we focus on the coverage of all warning paths. As this process repeats, each time a symbolic execution reaches an overflow point, we call the buffer overflow validation module to check whether buffer overflow can indeed happen. If the overflow point is contained in a loop, the symbolic execution will repeat the loop until it reaches the upper bound of loop times. Since the static analysis does not access some runtime information, such as the function pointers, the ICFG is imprecise. However, since we only eliminate the paths that do not lead to the warning, the ICFG precision problem only affect the efficiency but not the correctness.

The input to the buffer overflow validation module are a warning path set and corresponding warning point. The output of the buffer overflow validation module is whether buffer overflow can indeed occur at the warning point; if yes, then output the test case that can trigger the buffer overflow. To achieve this, we give all the conditions that warning path needs to satisfy and the conditions for triggering buffer overflow at the warning point to a constraint solver to examine whether all these conditions can be all satisfied at the same time. If the constraint solver reports that all these conditions can be all satisfied, the solver also outputs a solution that satisfies all conditions. Based on this constraint solver solution, we generate a test case that is guaranteed to trigger buffer overflow at the warning point. We classify this warning point, along with the test case, as a true warning. If the constraint solver reports that all these conditions cannot be all satisfied, then we classify this warning point as a false warning. We classify all warnings other than true warnings and false warnings as undecided warnings. We have undecided warnings because of three main reasons. First, the constraint solver may not be able to finish within a reasonable amount of time because the path conditions and overflow conditions are too complex. Second, a warning point may not be reachable by the symbolic execution engine due to unknown library calls. When an execution path contains a library call that the symbolic execution engine does not have the source code, the symbolic execution engine terminates the execution path as it cannot explore further. Third, a warning point may not be reachable by the symbolic execution engine within a reasonable amount of time due to path explosion within known library calls. When an execution path contains a library call that the symbolic execution engine does have the source code, the symbolic execution engine enters the library call and explore all execution paths, which can grow exponentially with the number of branches. Note that BovInspector does not have path explosion issues for the source code outside of known library calls because of our path pruning technique based on warning paths.

For each validated true buffer overflow warning, as we have the information of the buffer operations (via API calling or direct buffer accessing), and the locations (i.e., statement label) of buffer initialization, buffer operations, and overflow triggering in the source code, the targeted automatic repair module 105 applies programmer suggested repair approaches in the specific location in the source code to repair the buffer overflow vulnerabilities. By investigating 100 highly ranked buffer overflow vulnerabilities from 2009 to 2014 in the Common Vulnerabilities and Exposures (CVE) 1 and the benchmarks from prior buffer overflow detection work, we discover a total of 17 repair strategies. As one buffer overflow vulnerability can be repaired using many strategies, we adopt the two most prevalent repair strategies in the targeted automatic repair module: boundary checking and API replacement. Here the repair strategy of adding boundary checking is universally applicable to all buffer overflow vulnerabilities, and the repair strategy of replacing unsafe API by safe ones is only applicable to the vulnerability caused by an unsafe API and the unsafe API has a safe counterpart. When both strategies are applicable, our targeted automatic repair module asks the user to choose one strategy to apply. In the strategy of boundary checking, we automatically generate a code segment for boundary checking and instrument into the source code before the buffer overflow operation. This code segment first checks whether a buffer overflow can happen; if overflow cannot happen, then the code proceeds as normal; if overflow can happen, then the code segment triggers predefined overflow reaction mechanisms such as terminates the program. In the strategy of API replacement, we replace the unsafe API by a safe one that implements the same functionality.

FIG. 2 illustrates the sample source code for warning reachability analysis in accordance with some embodiments. The source code in FIG. 2 is used to illustrate the Inter-procedural Control Flow Graph in FIG. 3, and the method for Warning Reachability Analysis in FIG. 4. Details regarding the source code are discussed below in FIG. 3 and FIG. 4.

Figure 3:
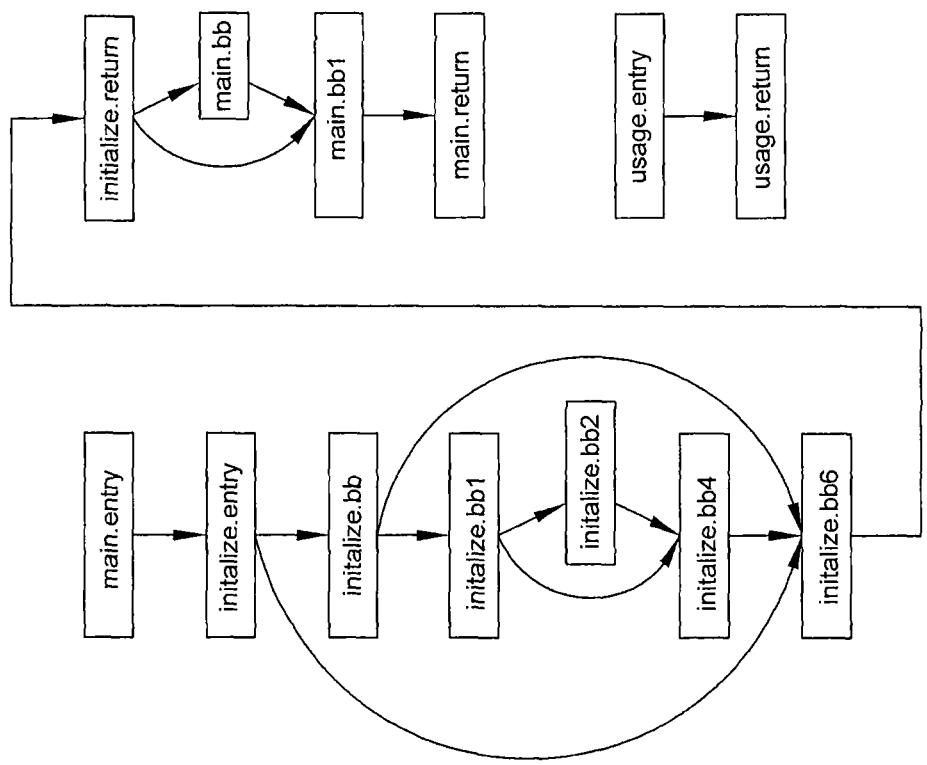
FIG. 3 illustrates an example of Inter-procedural Control Flow Graph (ICFG) in accordance with some embodiments.

FIG. 3 illustrates an example of Inter-procedural Control Flow Graph (ICFG) in accordance with some embodiments. Given the source code in FIG. 2, the first step is to perform static analysis to generate software vulnerability warnings which include buffer overflow. According to some embodiments, a static program analysis tools named "Fortify" provides the buffer overflow vulnerability warnings. According to some embodiments, Fortify performs static analysis on the source code of a program in FIG. 2 and outputs software vulnerability warnings which include buffer overflow. According to some embodiments, line number ln is implemented to represent a statement label in the target program source code. According to some embodiments, in cases there are more than one file in the source code, the file information is added. A static buffer overflow warning ω is represented as a tuple: $(<l_1, l_2, \ldots, l_n>; b)$, where $l_1$ is the statement label that a buffer is first declared, each $l_i$ ($2 \le i \le n$) is a statement label that an operation is performed on the buffer, and b is the statement label that overflow occurs on the buffer. According to some embodiments, b is a buffer warning point. According to some embodiments, considering the sample source code in FIG. 2, the static analysis tool reports four possible buffer overflow vulnerability warnings that can be represented as (<4>, 6), (<9>, 15), (<19, 20, 9>, 16), (<19, 24>, 31). According to some embodiments, taking warning (<19, 20, 9>, 16) as an example, 16 means that line 16 is a warning point and <19, 20, 9> means that lines 19, 20, and 9 constitute a path segment. According to some embodiments, the warning (<19, 20, 9>, 16) means that an execution path containing line 19, line 20, and line 9 may lead buffer overflow to occur at line 16.

Figure 4:
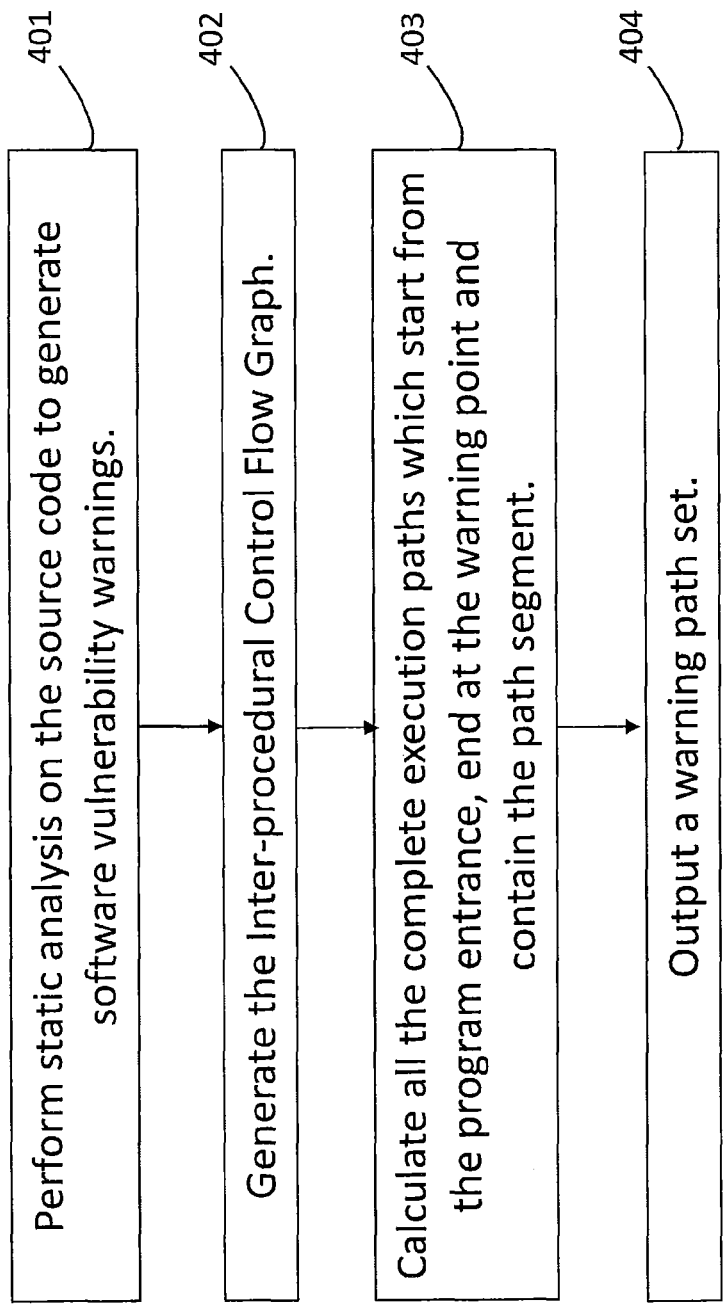
FIG. 4 is a flowchart illustrating the method for warning reachability analysis in accordance with some embodiments.

FIG. 4 is a flowchart illustrating the method for warning reachability analysis. At step 401, the method performs static analysis on the source code to generate software vulnerability warnings. Given the source code in FIG. 2, the first step is to perform static analysis to generate software vulnerability warnings which include buffer overflow. According to some embodiments, a static program analysis tools named "Fortify" provides the buffer overflow vulnerability warnings. According to some embodiments, Fortify performs static analysis on the source code of a program in FIG. 2 and outputs software vulnerability warnings which include buffer overflow.

At step 402, the method generates the inter-procedural control flow graph (ICFG). A control flow graph (CFG) is a directed graph in which the nodes represent basic blocks, and the edges represent control flow paths, where a basic block (bb) is a linear sequence of program instructions that has one entry point (the first instruction executed) and one exit point (the last instruction executed). Inter-procedural Control Flow Graph considers the calling relationships among procedures and illustrates the control flow behavior of the entire program. According to some embodiments, the analysis of the source code focus on statements instead of instructions. According to some embodiments, each edge in a CFG is a bi-direction edge. According to some embodiments, static analysis cannot access function pointers. According to some embodiments, function calls are treated such as normal statements, which lead to the inaccuracy of the ICFG in the guided symbolic execution module 103. According to some embodiments, the ICFG's are used to determine which execution path cannot lead to the buffer overflow point, the execution path containing function pointers will not be removed when it is executed to the function pointers. According to some embodiments, all sub-paths in the function pointers are explored. According to some embodiments, the inaccuracy of the ICFG may influence the effectiveness of the warning reachability analysis method. According to some embodiments, all sub-paths in the function pointers are considered, the decisions are guaranteed to be correct.

At step 403, the method calculates all the complete execution paths which start from the program entrance, end at the warning point and contain the path segment. After the ICFG for the given program is generated, for each path segment of a buffer overflow warning point, the method calculates all the complete execution paths that start from the program entrance, end at the warning point and contain the path segment. According to some embodiments, considering the warning point 16 and the path segment <19, 20, 9> for the source code in FIG. 2, the method needs to calculate the complete execution paths that start from the program entrance (i.e., line 19), end at the warning point (i.e., line 16), and contain lines 19, 20, and 9. According to some embodiments, the input of warning reachability analysis is the buffer overflow warning set W. According to some embodiments, each time one ω is selected from W for the analysis. According to some embodiments, the analysis is based on ICFG, the buffer overflow warning needs to be mapped to ICFG. According to some embodiments, first map each statement label in ω to its corresponding basic block. According to some embodiments, then use the statement label of the entry statement in the basic block to represent the basic block. According to some embodiments, considering the warning point 16 and the path segment <19, 20, 9>, line 16 in the source code in FIG. 2 corresponds to node initialize.bb4 in the ICFG, line 19 in the source code corresponds to node main.entry in the ICFG, both line 20 and line 9 in the source code correspond to node initialize.entry in the ICFG because lines 20 and 9 are in the same basic block, accordingly a path segment (<19, 20>), 16 in ICFG is obtained.

According to some embodiments, all complete execution paths covering the buffer overflow warning are calculated. The output is represented as a warning path set. A warning path set ps is represented as sequence <$P_1$, $P_2$, . . . , $P_m$>, where each $P_i$ is a set of path segments ρ, and each path segment ρ records all possible sequential control flow nodes that connect adjacent statement labels in corresponding buffer overflow warning ω. According to some embodiments, in a warning path set, each path segment in $P_1$ starts with the statement label of the program entrance and ends with the corresponding basic block entrance of the statement label $l_1$ in the corresponding warning ω. According to some embodiments, a ps can represent all complete path from the entrance of the program to a buffer overflow point.

According to some embodiments, to generate the warning path set of a program, a depth-first traversal on the ICFG to find the complete paths is performed. According to some embodiments, this method leads to the traversal of many paths that does not contain any path segments in the buffer overflow warning. According to some embodiments, a backward tracking on the ICFG starting from warning points is performed. According to some embodiments, for each warning point, traverse the ICFG starting from the warning point following the reverse direction of each edge. According to some embodiments, bi-direction edges in CFG is implemented. According to some embodiments, the reversed-ICFG (RCFG) is obtained for the analysis. According to some embodiments, the depth first search is implemented to calculate the all warning segments between last adjacent statement label pair in the control flow. According to some embodiments, all the path segments for the statement label pair are stored in a segments set. According to some embodiments, the path segments for previous adjacent statement label pair in the buffer overflow warning is calculated. According to some embodiments, the segments set is combined with previous segments set. According to some embodiments, these steps repeat until the program entrance is reached. According to some embodiments, the warning path set of the input buffer overflow warning is obtained.

At step 404, output a warning path set. According to some embodiments, the output of the warning reachability analysis is a warning path set, which covers the buffer overflow warning set. By backward tracking, the ICFG nodes which do not lead to warning point can be ignored. According to some embodiments, find the set of complete execution paths starting from the program entrance, covering corresponding buffer overflow warning.

According to some embodiments, for example, to backward track from initialize.bb4(Line 16) to initialize.entry (Line 20), the following warning path segments set is obtained: {(initialize.entry, initialize.bb, initialize.bb1, initialize.bb4), (initialize.entry, initialize.bb, initialize.bb1, initialize.bb2, initialize.bb4)} i.e. (<20, 12, 14, 16>; <20, 12, 14, 15, 16>)

According to some embodiments, for simplicity, the entrance statement label of basic block is implemented when describing a path segment. According to some embodiments, from initialize.entry(20) to main.entry(19), there is only one path segments (<19, 20>). According to some embodiments, the complete execution path set ((<19, 20>), (<20, 12, 14, 16>, <20, 12, 14, 15, 16>)) that covers the buffer overflow warning (<19, 20, 9>, 16) is calculated. According to some embodiments, through warning reachability analysis, unreachable warning in the ICFG can also be identified. According to some embodiments, if a buffer overflow warning point cannot be reached by traversing the ICFG from the program entrance, the buffer overflow warning is unreachable. According to some embodiments, such buffer overflow warnings are considered as false alarms. According to some embodiments, the buffer overflow warning (<4>, 6) is unreachable as both line 6 and line 4 in the source code correspond to node 313 usage.return and this node is unreachable from the program entrance represented by node 301 main.entry, so it is an unreachable warning.

According to some embodiments, the warning path set is the output of the warning reachability analysis. According to some embodiments, the warning path set records all complete paths of the buffer overflow warnings which can be reached from program entrance in the ICFG. According to some embodiments, the warning path set is implemented as an input to guide symbolic execution to trigger buffer overflow.

Figure 5:
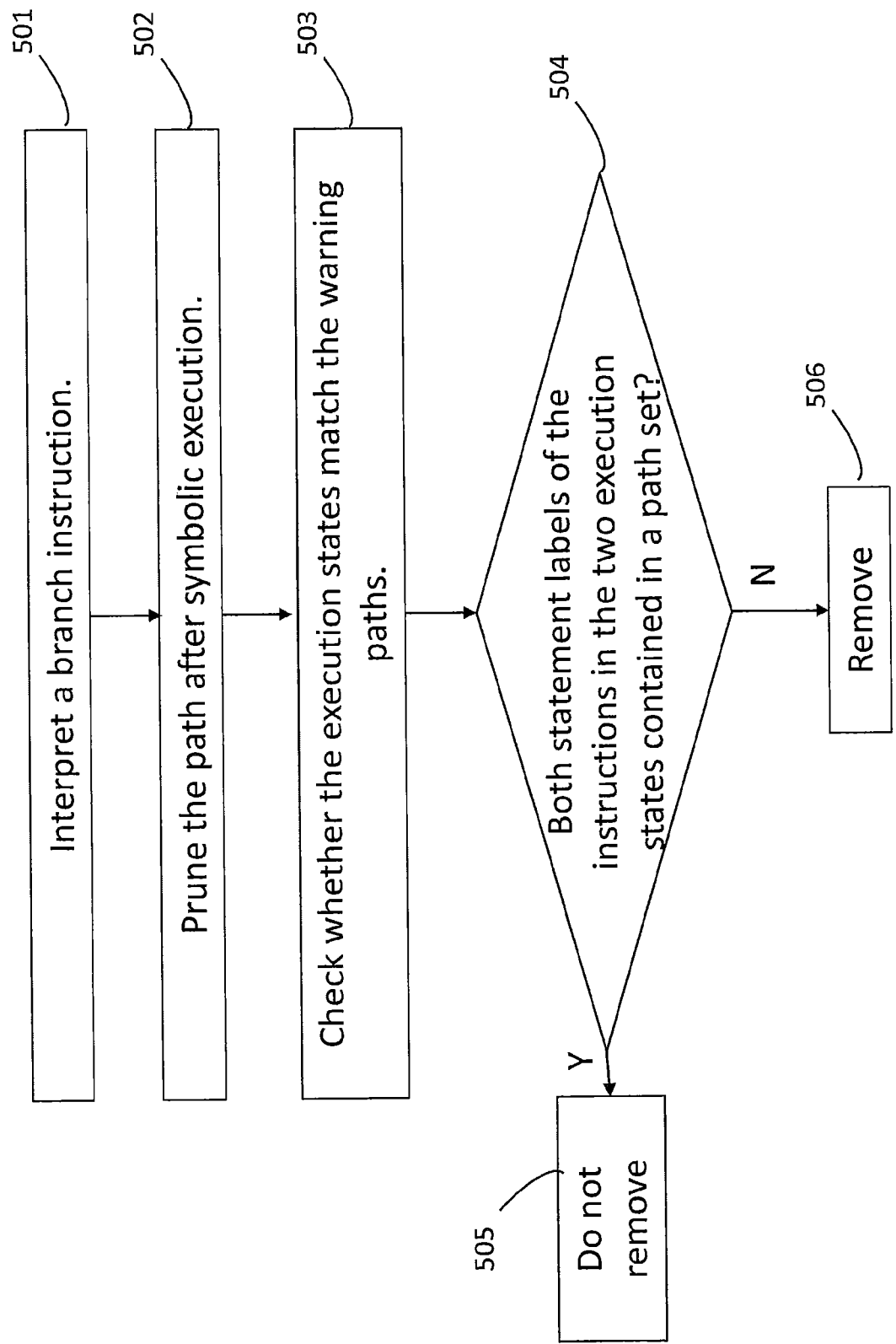
FIG. 5 is a flowchart illustrating the method for guided symbolic execution in accordance with some embodiments.

FIG. 5 is a flowchart illustrating the method for guided symbolic execution in accordance with some embodiments. According to some embodiments, symbolic execution is performed on the source code starting from the program entrance. Symbolic execution is a classical technique for software testing and analysis, which is used to systematically test a program and generate test input with high coverage. Symbolic execution uses symbolic values as the input, instead of concrete input, to explore the execution space of a program. When symbolic execution encounters a branching condition, it forks the execution path, following both branch directions and updating the corresponding path constraints on the symbolic input. When the execution reaches a program exit or hits an error, the current path constraint will be solved to find a concrete test case that drives program execution to this program location.

In practice, a program may have a large or infinite number of paths because of numerous conditionals, loops, and recursions, which leads to path explosion issue in symbolic execution. According to some embodiments, in order to avoid path explosion, the warning paths are implemented to guide the symbolic execution so that only these warning paths and followed. According to some embodiments, the traditional search strategies focus on the better coverage of the program. According to some embodiments, emphasis is put on exploring the warning paths obtained from the warning reachability analysis. According to some embodiments, in a symbolic execution engine, a searcher module decides how the symbolic execution engine chooses the execution path to continue the exploration of the program execution states. The guided symbolic execution is implemented by modifying the searcher.

According to some embodiments, during symbolic execution, each execution path corresponds to an execution state. Each execution path contains the path constraints of corresponding execution, which can be treated as complete path information. According to some embodiments, the execution path does not provide the exact path direction information such as the branches that it traveled. In order to guide symbolic execution to focus on the buffer overflow warning paths, a strategy is implemented to remove the execution state that do not lead to any of the warning paths during symbolic execution, which can be viewed as pruning unnecessary path. A key issue is to decide which paths need to be pruned.

At step 501, the method interprets a branch instruction, and only checks the two execution states that correspond to the branch.

At step 502, the method prunes the path after symbolic execution. According to some embodiments, a decision is made to prune the path after the symbolic execution engine finishes interpreting a branch instruction and only check the two execution states that correspond to the branch. According to some embodiments, this strategy has to two motivations. First, focus can be put on the new generated execution state and the original one, if the unnecessary path can be pruned at the very beginning when it is generated, the symbolic execution engine can explore the necessary paths more efficiently. Second, the branch choice information can be helpful to better identify an execution path. According to some embodiments, the information can be obtained by checking the location of the current instruction in the two execution states after the branch instruction.

At step 503, check whether the execution states match the warning paths. According to some embodiments, to decide whether an execution state can be removed from the execution state pool, the method needs to check whether the execution states match the warning paths. According to some embodiments, the symbolic execution engine maintains the information of each instruction, including the corresponding statement. According to some embodiments, the entrance statement label is implemented to represent the corresponding basic block, and the warning path set is implemented to represent the paths to be explored.

At step 504, decide whether both statement labels of the instructions in the two execution states contained in a path set. According to some embodiments, the statement labels of the instruction in the two execution state are compared. According to some embodiments, if both statement labels are contained in the path set, at step 505, do not remove any of the execution states. According to some embodiments, if only one statement label is contained in a certain warning path segment, at step 506, the execution state corresponding to the other statement label is removed. According to some embodiments, the method does not remove any of the execution state if neither of the two statement labels can match any warning path segments. According to some embodiments, one reason is that sometimes the symbolic execution engine may explore the internal part of some library calls that do not appear in any warning path, which causes the two execution states after a branch not to appear in any warning path. According to some embodiments, another reason is that although the warning paths generated by warning reachability analysis do not contain loops, some buffer overflows are triggered by several times of a loop. According to some embodiments, the method in FIG. 5 allows an execution to continue after calling the buffer overflow validation module if the result is that the path cannot trigger buffer overflow and the buffer overflow point is in a loop. According to some embodiments, for the reason that the branch information after the buffer overflow point are not contained in any warning path, the execution is allowed to explore the remaining part of the loop. When an execution reaches the exit of the loop, which is a branch, the execution state jumping back to the entrance of the loop will find a match because the buffer overflow point is in the loop and the entrance of the loop is contained in the warning path. According to some embodiments, the method in FIG. 5 can guide symbolic execution to repeat the loop until the loop ends or a buffer overflow is found in a specific loop time.

According to some embodiments, taking the program in FIG. 2 as example, the warning path set is ((<19, 20>), (<20, 12, 14, 16>, <20, 12, 14, 15, 16>)). The symbolic execution begins to explore program execution states from the entrance of the main program at line 19. The execution executes the statements step by step until it meets a fork statement in the program at line 10. Then, the symbolic execution engine duplicates the execution, points the two executions to the true branch at line 11 and the false side branch at line 12 of the fork statement, respectively, and prepares to add the new execution to the execution pool. For the reason that the true branch at line 11 is not contained in a warning path, the true branch at line 11 is removed from the execution pool. The similar situation happens when the execution meets the next fork statements at line 12. The executions that lead to line 13 will be removed. Only the execution states following the warning paths set is kept in the execution state pool.

Figure 6:
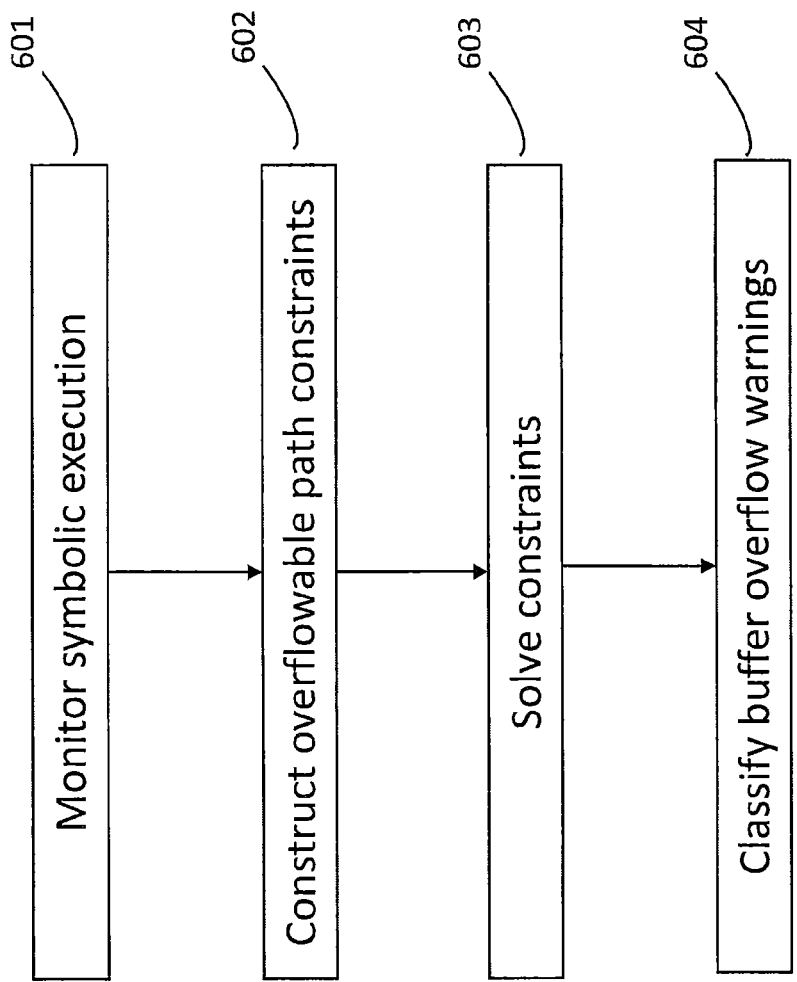
FIG. 6 is a flowchart illustrating the method for buffer overflow validation in accordance with some embodiments.

FIG. 6 is a flowchart illustrating the method for buffer overflow validation in accordance with some embodiments. Most symbolic execution engines, such as KLEE, only identify some common defects such as null pointers and out-of-bound pointers during runtime. They could not, however, report exact buffer overflow vulnerabilities. To validate a buffer overflow warning during symbolic execution, a buffer overflow vulnerability model is introduced, and the symbolic execution engine is extended to detect buffer overflow at runtime.

According to some embodiments, there are two categories of buffer operations: API calling and directly buffer accessing. The APIs, such as strcpy or memset, can be treated as buffer processing related API calling, while the operations on array or contents of pointers can be treated as directly buffer processing. The API calls refer directly to buffer processing because the buffer overflow can be detected only by examining the parameters. According to some embodiments, for the first step, the method fetches the buffer information from the symbolic execution engine. The buffer information provides a memory management model to handle the information of parameters. The memory management model is extended to obtain buffer information. When the parameters are passed to the APIs or for direct buffer processing, the memory objects of corresponding parameters are obtained. The information of the buffer to be checked is obtained by analyzing the memory object, such information includes the beginning of the buffer, the offset from beginning address and the size of buffer. The symbolic execution engine updates the content in the buffer whenever there is operation about the buffer. For the reason that the memory object is checked when the APIs or direct buffer operations are ready to be executed, the buffer information is the up-to-date, and accordingly, whether buffer overflow can be triggered can be accurately validated. According to some embodiments, when the data copied to the buffer is symbolic, the length information is difficult to obtain. To address this issue, a model to represent the length of a symbolic variable is implemented. According to some embodiments, let b be a symbolic string variable, Len(b) denote the length of string b in bytes, and '\0' denotes the end of a string. In the model, the following constraints based on string length to judge buffer overflow are applied: Len (b)=i, where vj satisfy $0 \leq j < i$, $P_b[j] \neq$ '\0' & $P_b[i]=$'\0'. To unify the validation model, the definition on both symbolic strings and const strings are applied. As discussed before, use Size(b) is used to represent the size of the buffer assigned to the parameter b, which can be obtained from the memory management model in the symbolic execution engine. According to some embodiments, when calculating the length of buffer b, if the first Size(b) bytes has no '\0', it means that the string in the buffer has no terminator. According to some embodiments, Len(b) is considered to be infinite.

According to some embodiments, for API calling, the buffer overflow can be detected by checking the parameters. According to some embodiments, constraint models for the APIs operating buffers in C99 and Linux system call interface are implemented. In order to check the occurrence of buffer overflow, examine whether the data written to buffer is longer than the buffer size. Table I illustrates the constraints for different types of APIs. The APIs are classified into eight types based on their parameters format. Types 1-5 are related to string processing, while Type 6-8 are related to file processing.

At step 602, construct overflowable path constraints. To validate whether a buffer overflow warning point is vulnerable, identification needs to be made regarding the evidence of fortifying the symbolic execution to trigger the buffer overflow as well as to touch the buffer overflow point. For the first step, an overflowable path constraint is obtained. An overflowable path constraint opc is the conjunction of the path constraints and the buffer overflow constraints. The path constraints are collected during symbolic execution, represented as $\varphi_1 \hat{} \ldots \hat{} \varphi_n$, where each $\varphi_i$ ($1 \leq i \leq n$) is the constraint about the symbolic input which should be satisfied in corresponding path branch direction. The buffer overflow constraint is the overflowable condition according to specific buffer operations. All buffer overflow constraints are shown in Table I.

During the guided symbolic execution, the extended Executor collects current path constraints for targeting the buffer overflow points. For triggering the buffer overflow, the extended Executor constructs warning path constraints according to the buffer overflow vulnerability models. In the

TABLE I

BUFFER OVERFLOW VALIDATION MODELS

| Type | API | Parameters Format | Buffer Overflow Constraints | Safe API Option |
|---|---|---|---|---|
| 1 | strcpy | (char * dest, const char * src) | Len(src) ≥ Size (dest) | strncpy(dest, src, sizeof(dest)) |
| 2 | strncpy memcpy, memmove, memset, snprintf, vsnprintf | (char * dest, const char * src, size_t n) | n > Size(dest) | |
| 3 | strcat | (char * dest, const char * src) | Len(src) + Len(dest) ≥ Size(dest) | snprintf(dest + strle n(dest), sizeof (dest) − strlen(dest), "% s", src) |
| 4 | strncat | (char * dest, const char * src, size_t n) | min{Len(src), n} + Len(dest) ≥ Size(dest) | |
| 5 | sprintf vsprintf | (char * str, const char * format, . . .) | format string length ≥ Size(str) | snprintf(str, sizeof(str), format, . . .) |
| 6 | fgets | (char * str, int num, FILE * stream) | num > Size(str) | |
| 7 | fread | (void * ptr, size_t size, size_t count, FILE * stream) | size * count > Size(ptr) | |
| 8 | read | (int fd, void *buf, size_t count) | count > Size(buf) | |
| 9 | buf[i], *(buf + i) | | i * typesize ≥ Size(buf) | |

According to some embodiments, for type 9, the following constraint models for array and pointer accessing are proposed. Accessing the buffer by array accessing can be represented as buf[i]=ch, while buf represents a buffer, i is an integer, and ch is the value to be assigned to the corresponding address. In this model, the buffer overflow condition is i×typesize≥Size(buf). Accessing the buffer by pointer accessing can be represented as *(buf+i)=ch. In the model, the buffer overflow condition is: i×typesize≥Size (buf).

According to some embodiments, the core module of an symbolic execution engine is the Executor. The Executor reads instructions from a bytecode file one by one, parsing the operands and operators of the instruction, writing or reading the memory according to the semantics of the instruction. The Executor is extended so that it could monitor buffer overflow vulnerability related operations for buffer overflow vulnerability discovery during symbolic execution. The extended Executor is illustrated in FIG. 6.

At step 601, monitor symbolic execution. After an instruction is read, the extended Executor checks the instruction type and composes buffer overflow constraints at runtime based on the buffer overflow vulnerability models. The memory management module is extended in the symbolic execution engine, so the information of memory object can be obtained, including the buffer size, the first address of buffer and the address of idle space in the buffer.

buffer overflow warnings, the buffer operation statement, where the buffer overflow may happen, is recorded. When the extended Executor meets the buffer operation statement, the extended Executor checks the buffer overflow model to obtain corresponding buffer overflow constraints. Finally, for a buffer overflow warning, a buffer overflow constraint composed at runtime is combined with the current path constraints to form the final overflowable path constraint.

At step 603, solve constraints. When the overflowable path constraint is constructed, the extended Executor calls the constraint solver in the symbolic execution engine to proceed the test input generation. The classification result depend on the output of constraint solver is reported. According to some embodiments, assume that the buffer overflow will happen if and only if the overflowable path constraint is solvable. Based on this assumption, eventually, buffer overflow warning are classified into three categories, true warnings, false warnings, and undecided warnings.

At step 604, classify buffer overflow warnings. First category, if the overflowable path constraint is solvable, then the buffer overflow reported by static analysis will definitely happen since the inputs satisfy the conjunction of the buffer overflow constraints and path constraints. Accordingly, output one test case that will follow the execution path and trigger the buffer overflow. For the reason that multiple path segments may targeted the same buffer overflow point regarding to a buffer overflow warning, stop exploring other path segments when one test case can execute the path segments and trigger the buffer overflow. Accordingly, the buffer overflow warning is classified as a true warning.

Second category, if an overflowable path constraint is unsolvable, then there is no test input to direct the symbolic execution along the selected path leading to the buffer overflow point as well as to trigger the buffer overflow. In this scenario, check is made regarding whether current execution path is in a loop, if so, such execution will be allowed to continue until it reach the upper bound of a loop; or else, corresponding execution state will be removed because it is considered as a safe path. Further, the Executor will select another execution path to continue the symbolic execution. When none of the warning paths targeted to a buffer overflow point can trigger buffer overflow, the buffer overflow warning is classified as a false warning. As discussed above, because unreachable warning do not have exact execution path to cover, it cannot reach the buffer overflow point. Accordingly, such warning is classified as false warning.

Last category, a time limit is set for each path set to a buffer overflow point. Once the procedure exceeds the time bound, which means that the solver cannot determine whether there is a solution to the constraints, or the buffer overflow point cannot be reached. When the constraint solver times out while solving the overflowable path constraints or the symbolic execution halts for undesirable faults, the buffer overflow warning is classified as an undecided warning.

According to some embodiments, considering the sample source code in FIG. 2 and the two buffer overflow warnings generated by Fortify (<9>, 15) and (<19, 20, 9>, 16), the validation module is called when an execution executes statement 15 and statement 16. As discussed above, in statement 16, the path constraint (strlen(argv_string)≠0), (strlen(argv_string)<24), and (argv_string[0]=='-') are gathered. Then, the constraint of strcpy(Len(argv string)≥Size(mapped argv)) is added and the constraint solver is called. A test case (argv=='-abcde') is generated to trigger the buffer overflow. For the API strcat in statement 15, the buffer overflow constraint is (Len('-')+Len(mapped argv)>Size(mapped argv)). For the reason that the string in mapped_argv is null, the constraint cannot be satisfied for all paths reaching statement 15, which means that the buffer overflow warning is a false alarm.

According to some embodiments, the buffer overflow validation module reports the true buffer overflow warnings. Each of the warnings contains the information of the buffer operations (via API calling or direct buffer accessing), and the locations (i.e., statement label) of buffer initialization, buffer operations, and overflow triggering in the source code, the test case to trigger the vulnerability and corresponding execution paths. Suggestion to fix the buffer overflow vulnerability automatically can be provided with this information.

To provide repair suggestion, officially adopted or programmers preferred fix approaches are investigated for buffer overflow vulnerabilities in real world programs, which are reported in Common Vulnerabilities and Exposures (CVE). According to some embodiments, 100 buffer overflow vulnerabilities from CVE are selected. These cases are the benchmarks in prior works, or those with the highest severity rating from 2009 to 2014 in open source programs. Based on the CVE information, the vulnerable software versions of corresponding buffer overflow vulnerabilities can be tracked. For every buffer overflow vulnerability, two corresponding versions are selected; the vulnerability is introduced in the first version, and fixed in the second version. By comparing the two versions, the exact location of the buffer overflow vulnerability and how it is fixed can be discovered.

Table II shows the survey result of the 100 buffer overflow cases.

TABLE II

SURVEY RESULT OF BUFFER OVERFLOW IN CVE

| Operation | Number | Repair Method | Number |
|---|---|---|---|
| array | 31 | Add boundary check | 48 |
| memcpy | 15 | API replacement | 10 |
| sprintf | 13 | Use larger buffer | 10 |
| pointer | 7 | Fix boundary check | 8 |
| strcpy | 6 | Add interger check | 5 |
| strncpy | 5 | Malloc check | 4 |
| sscanf | 4 | String reformat | 4 |
| malloc related | 4 | Add string end | 4 |
| memset | 3 | Use unsigned value | 3 |
| fread | 2 | Limit index range | 2 |
| strcat | 2 | Use concrete length | 2 |
| memmove | 1 | Avoid add operation | 1 |
| strncmp | 1 | Check return pointer | 1 |
| CryptGetHashParam | 1 | Reimplement | 1 |
| FT_Stream-> read | 1 | Restore after malloc failure | 1 |
| gzread | 1 | Check return array | 1 |
| read | 1 | Replace loop format | 1 |
| recv | 1 | | |
| write | 1 | | |

The left two column list the statistics of the buffer overflow operations. According to some embodiments, the most frequent buffer overflow operation is direct buffer access through array, which occurs 31 times in the 100 case, while memcpy triggers buffer overflow 15 times and sprintf triggers 13 times. The right two columns of Table II show the statistics about the fix methods of the buffer overflows. Nearly half of these vulnerabilities (48%) are patched by "add boundary check" before the buffer operations, while "API replacement" and "use larger buffer" share the second place. For targeted automatic repair, the most popular repair methods are selected. However, some of the methods (such as "use larger buffer") are program specific, which is not a general solution for automated repair. As a result, "add boundary check" and "API replacement" are selected as two repair modes for targeted automatic repair module.

The basic idea to perform automatic repair is to traverse the true buffer overflow report of target program, to find the buffer overflow locations in every source code file recorded in the report, and to apply one of the repair modes on the buffer overflow operation. For each true buffer overflow warning, first fetch the parameters from the corresponding buffer overflow operation. In mode of "add boundary checking", generate a buffer bound violation checking code segment, including overflowable condition, and corresponding action. The overflowable condition is composed of the parameters fetched and buffer overflow constraint according to Table I for corresponding buffer operation. The action body provides response when the buffer overflow condition is met, for example, a buffer overflow error is reported and upcoming buffer operation is terminated. Then, the repair code segment is instrumented before the buffer operation. If a buffer operation API contains a functional equivalent safe API option according to Table I, then apply the repair mode of API replacement to replace the vulnerable API with a corresponding safe API. According to some embodiments, there are multiple vulnerabilities in one file. Since the present approach may change the line number after the buffer overflow location, the buffer overflow points from the bottom of the source code file is fixed. The output of this module is the repaired source code of the program; the programmer can choose whether to apply such repair schemes.

To illustrate the effect of the targeted automatic repair module, take the validated buffer overflow in the sample program in FIG. 2 as an example. As mentioned in above, BovInspector validates that the strcpy in line 16 is a true buffer overflow and generates a buffer overflow report for it. The report is then used as an input to the targeted automatic repair module. By checking the repair list, two repair plans are provided. For boundary checking, fetch the parameters mapped argv and argv string from the operation strcpy, check the relationship of the two buffers mapped argv and argv string based on the buffer overflow constraint in Table I. FIG. 4 shows the corresponding repaired source code of the vulnerability in mode boundary checking. The code segment is instrumented before buffer operation in the source code to ensure that the buffer operation won't be executed if the buffer overflow condition is satisfied. As a result, buffer overflow won't be triggered. For API replacement, as shown in Table I, strcpy can be replaced by a safe API strncpy with appropriate parameters. According to some embodiments, similar for boundary checking, the parameters mapped argv and argv string from strcpy are fetched. In order to guarantee that the buffer overflow will not be triggered, the number of characters copied to buffer mapped argv should not be greater than the size of buffer mapped argv.

FIG. 7 is a figure illustrating the source code for API replacement in accordance with some embodiments. The repaired source code after mode API replacement is shown.

Figure 8:
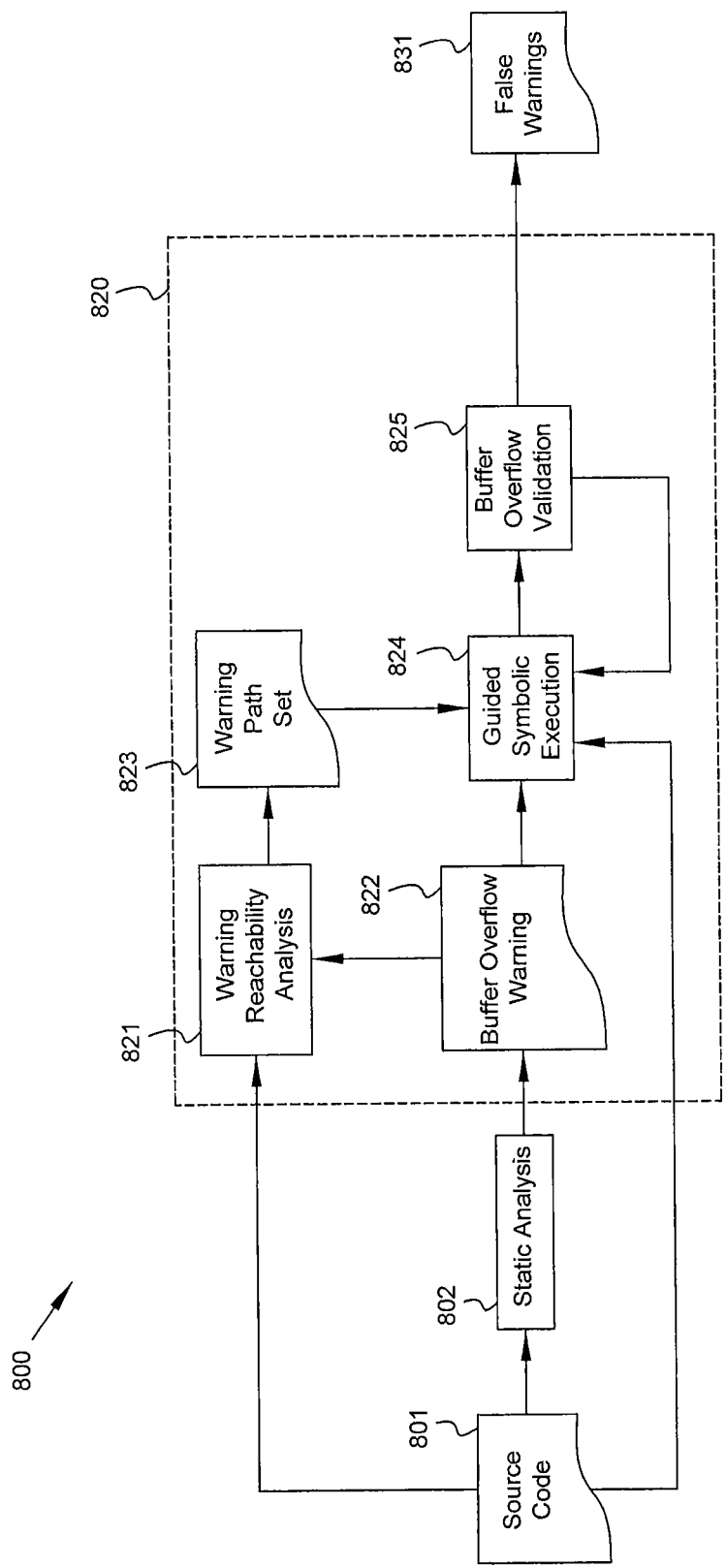
FIG. 8 is a flowchart illustrating the method for buffer overflow validation in accordance with some embodiments.

FIG. 8 is a flowchart illustrating the method for buffer overflow validation in accordance with some embodiments. The buffer overflow analysis module 820 includes a warning reachability analysis module 821, a guided symbolic execution module 824, a buffer overflow validation module 825. The buffer overflow analysis module 820 also includes buffer overflow warning document 822 and warning path set document 823. A source code document 801 is transmitted to a static analysis module 802, and the output of the static analysis module 802 is transmitted to the buffer overflow warning document 822 inside the buffer overflow analysis module 820. The source code 801 is also transmitted to the warning reachability analysis module 821 inside the buffer overflow analysis module 820 and the guided symbolic execution module 824 inside the buffer overflow analysis module 820. The output of the buffer overflow warning module 822 is transmitted to the warning reachability analysis module 821 and the guided symbolic execution module 824. The output of the warning reachability analysis module 821 is transmitted to the warning path set 823, which is in turn transmitted to the guided symbolic execution module 824. The output of a buffer overflow validation module 825 is transmitted to the guided symbolic execution module 824 and a false warning document 831.

According to some embodiments, the warning reachability analysis module is implemented in LLVM 2.94. LLVM (Low Level Virtual Machine) is a compiler infrastructure designed as a set of reusable libraries with well-defined interfaces. LLVM can be used for code analysis during compile-time, link-time, and run-time. According to some embodiments, the symbolic execution direction module and buffer overflow validation module are implemented on KLEE, which is a symbolic execution engine built on top of the LLVM compiler infrastructure. According to some embodiments, the static buffer overflow detector used in the experiments is HP Fortify version 3.2.

According to some embodiments, experiments were conducted on a quad-core machine with an Intel Core™ Corei5-2400 3.10 GHz processor and 4G memory, running Linux 3.11.0. To evaluate the method, two sets of experiments are designed. The first set of experiments is designed to evaluate the correctness and accuracy of the method. The second set of experiments is designed to check the scalability and effectiveness of the method for real-world open source programs. According to some embodiments, through these experiments, the following issues are addressed: (1) how much effort can a developer save by validating buffer overflow warnings using the present technique? (2) how does the present technique perform on large-scale, real-world applications? (3) how efficient is the present technique? In order to evaluate the correctness and accuracy of the present method, 8 programs from GNU COREUTILS utilities are selected. These programs are relatively small and manual check can be conducted on the results. To increase the number of static analysis warnings for each program, both true and false buffer overflows are manually injected. The second experiment includes a case study on the use of the present method to validate buffer overflow on real world applications such as sendmail 8.12.7. No buffer overflow vulnerability is injected to these programs. All the programs are compiled by LLVM for the reachability analysis and then symbolic executed on KLEE with intermediate code.

TABLE III

BUFFER OVERFLOW VALIDATION RESULT

| | BovInspector Input | | | BovInspector Output | | | | | | | | | | | |
|---|---|---|---|---|---|---|---|---|---|---|---|---|---|---|---|
| | | | | Warning Points | | | | | | Path Segments | | | | | |
| | | | | #True | | #False | | #Undecidable | | #True | | #False | | #Undecidable | |
| Program | #L | #W | #P | # | % | # | % | # | % | # | % | # | % | # | % |
| chmod | 602 | 12 | 12 | 7 | 58.3 | 4 | 33.3 | 1 | 8.3 | 7 | 58.3 | 4 | 33.3 | 1 | 8.3 |
| tr | 1904 | 8 | 15 | 3 | 37.5 | 3 | 37.5 | 2 | 25.0 | 6 | 40.0 | 5 | 33.3 | 4 | 26.7 |
| pwd | 406 | 12 | 16 | 3 | 25.0 | 7 | 58.3 | 2 | 16.7 | 3 | 18.8 | 10 | 62.5 | 3 | 18.8 |
| sort | 3306 | 22 | 27 | 8 | 36.4 | 7 | 31.8 | 7 | 31.8 | 10 | 37.1 | 9 | 33.3 | 8 | 29.6 |
| su | 567 | 6 | 8 | 1 | 16.7 | 3 | 50.0 | 2 | 33.3 | 2 | 25.0 | 3 | 37.5 | 3 | 37.5 |
| ls | 4572 | 31 | 42 | 4 | 12.9 | 19 | 61.3 | 8 | 25.8 | 10 | 23.8 | 22 | 52.4 | 10 | 23.8 |
| pr | 2940 | 29 | 31 | 11 | 37.9 | 15 | 51.7 | 3 | 10.3 | 13 | 41.9 | 15 | 48.4 | 3 | 9.7 |
| df | 1014 | 18 | 18 | 9 | 50.0 | 9 | 50.0 | 0 | 0.0 | 9 | 50.0 | 9 | 50.0 | 0 | 0.0 |

TABLE III-continued

BUFFER OVERFLOW VALIDATION RESULT

| | BovInspector Input | | | BovInspector Output | | | | | | | | | | |
|---|---|---|---|---|---|---|---|---|---|---|---|---|---|---|
| | | | | Warning Points | | | | | | Path Segments | | | | |
| | | | | #True | | #False | | #Undecidable | | #True | | #False | | #Undecidable |
| Program | #L | #W | #P | # | % | # | % | # | % | # | % | # | % | # | % |
| polymorph-0.40 | 0.3k | 11 | 19 | 0 | 0.0 | 11 | 100.0 | 0 | 0.0 | 0 | 0.0 | 19 | 100.0 | 0 | 0.0 |
| bc1.06 | 9.7k | 5 | 15 | 1 | 20.0 | 3 | 60.0 | 1 | 20.0 | 1 | 6.7 | 11 | 73.3 | 3 | 20.0 |
| net-tool1.60 | 8.1k | 62 | 1256 | 6 | 9.7 | 36 | 58.1 | 20 | 32.3 | 251 | 20.0 | 763 | 60.7 | 242 | 19.3 |
| wwwcount2.3 | 8.3k | 20 | 112 | 1 | 5.0 | 5 | 25.0 | 14 | 70.0 | 1 | 0.9 | 50 | 44.6 | 61 | 54.5 |
| gzip1.2.4 | 5.1k | 19 | 237 | 1 | 5.3 | 12 | 63.2 | 6 | 31.6 | 4 | 1.7 | 148 | 62.4 | 85 | 35.9 |
| sendmail8.12.7 | 78.1k | 96 | 4854 | 1 | 1.0 | 51 | 53.1 | 44 | 45.8 | 1 | 0.0 | 3067 | 63.2 | 1786 | 36.8 |

[1] #L:Line of Code, #W: Number of Buffer Overflow Warning Points, #P: Number of Buffer Overflow Warnings The upper part of Table III shows the effect of BovInspector on the 8 programs from GNU COREUTILS utilities.

According to some embodiments, the basic information about the input of BovInspector is shown, including the line of code (# L), the number of buffer overflow warning points (#W), the number of buffer overflow warning paths (# P). For the output, the result for warning points and path segments are shown. According to some embodiments, both the numbers and percentages of the three types of BovInspector output are shown: true warnings, false warnings, and undecided warnings.

According to some embodiments, Result 1: BovInspector can significantly reduce the number of buffer overflow warnings to be manually checked due to its ability of identifying false warnings. From Table III, the number of undecided warnings are reduced to a low level by BovInspector on both the number of warning points and warning paths. For warning points, the proportion of determined reports (True and False) ranges from 66.7% to 100% with an average of 81.1%. For warning paths, the range is from 62.5% to 100% with an average of 80.7%.

According to some embodiments, Result 2: The true warnings and false warnings identified by BovInspector are all correct. To check the correctness of BovInspector, all buffer overflow warnings reported by Fortify are manually examined, the verified buffer overflow list are recorded, and then compare them with the true buffer overflow and false alarm reported by BovInspector. All true buffer overflow are contained in the buffer overflow list while none of the false alarm appears.

According to some embodiments, in order to evaluate the effectiveness of the present method on real world program, six programs are used in prior work on buffer overflow detection. To show the benefit of introducing the warning reachability analysis and guided symbolic execution, two sets of experiments are conducted. For the first set, the warning reachability analysis is included. For the second set, the warning reachability analysis is omitted and simply input the results from Fortify. According to some embodiments, the symbolic execution is terminated when all the buffer overflow warning points and path segments are traversed.

According to some embodiments, Result 3: the present method is capable of handling large-scale real-world programs. The lower part of Table III shows the buffer overflow inspection results on real programs. Most of the programs have almost 10 k of source code while the largest reaches 78.1 k. It is observed that BovInspector performs well on most of these programs and reports a large number of false alarms, especially for the warning paths. By comparing some existing works and the patches for the programs tested, all the validated buffer overflows reported by the present method are confirmed or fixed.

Table IV shows the time and memory consumption situation during different phase of our experiments.

TABLE IV

TIME AND MEMORY CONSUMPTION ON REAL PROGRAMS

| | Time Consumption(s) | | | | Memory Consumption(m) | | | |
|---|---|---|---|---|---|---|---|---|
| | BovInspector | | | | BovInspector | | | |
| Program | #RA | #SE + BV | #All | BovInspector—RA | #RA | #SE + BV | #All | BovInspector—RA |
| polymorph-0.40 | 0.11 | 101.2 | 101.31 | 294.2 | 2.4 | 36.1 | 36.1 | 87.1 |
| bc1.06 | 3.1 | 125.9 | 129 | 201.1 | 22.2 | 77.4 | 77.4 | 283.4 |
| net-tool1.60 | 39.8 | 282.7 | 322.5 | 2547.7 | 68 | 394.5 | 394.5 | 512.3 |
| wwwcount2.3 | 9.1 | 159.3 | 168.4 | 352.6 | 19.4 | 225.1 | 225.1 | 435.9 |
| gzip1.2.4 | 16.66 | 169.2 | 185.86 | 453.7 | 15.1 | 64.2 | 64.2 | 166.2 |
| sendmail8.12.7 | 145.8 | 5758.2 | 5904 | 7124.1 | 109.2 | 1435.1 | 1435.1 | 3046.9 |

[1] RA: Reachability Analysis, SE: Symbolic Execution, BV: Buffer Overflow Validation, BovInspector RA: Validation without the RA Module According to some embodiments, the following are listed: the statistics of reachability analysis (# RA), guided symbolic execution with buffer overflow validation (# SE+BV), total consumption (# All) and symbolic execution without reachable path guidance (BovInspector-RA). The unit of time consumption is second and the unit of memory consumption is megabyte. According to some embodiments, for the item # SE+BV, only those validated buffer overflows and false alarms are counted, since the undetermined buffer overflows are limited by a time bound, which may disturb the accuracy of the statistics. According to some embodiments, for a fair comparison, in the experiment set of the item BovInspector-RA, the experiment is stopped when symbolic execution covers the buffer overflow points and path segments reports of validated buffer overflows and false alarms.

According to some embodiments, Result 4, warning reachability analysis and guided symbolic execution guidance are effective. By comparing the statistics of symbolic execution with path guidance # All and without reachable path guidance (BovInspector-RA). According to some embodiments, the reachability analysis module and symbolic execution guidance module perform well in reducing the exploration space of symbolic execution. For time saving, the sum of # RA and # SE is counted, the largest proportion reaches 87.3% (net-tool-1.60) and the lowest proportion is 17.1% (sendmail-8.12.7). The average proportion is 45.3% and the total proportion is 37.9%. For memory consumption, since warning reachability analysis and guided symbolic execution are sequential, the following are compared: the largest memory consumption, the largest proportion reaches 72.7% (bc-1.06) and the lowest proportion is 23.0% (net-tool-1.60). The average proportion is 45.2% and the total proportion is 50.7%. So conclusion can be drawn that warning reachability analysis and guided symbolic execution can reduce a large number of time and memory consumption.

According to some embodiments, in order to show the effect of our targeted automatic repair module, eight validated buffer overflow warnings are chosen in three programs on the second set of experiments and apply automatic repair on the valid buffer overflow warning. According to some embodiments, the targeted automatic overflow repair module is implemented to fix the vulnerabilities on both the two modes, then Fortify is implemented to analyze the repaired code again to see whether the buffer overflow is fixed.

According to some embodiments, Result 5, the targeted automatic repair module can reduce the risk of buffer overflow or fix it. Table V shows the information of the buffer overflow being automatically repaired and the comparison between the original version and repaired version.

'Boundary Checking' and 'API-Replacement'. According to some embodiments, it is observed that with the boundary checking mode, two buffer overflow warnings are degraded to dangerous function rather than buffer overflow warning while for the rest of six buffer overflow warnings Fortify has no report about them. According to some embodiments, the API replacement mode performs better, none of the eight buffer overflow warnings are reported after repair. According to some embodiments, however, this mode is not proper for all the operations.

According to some embodiments, experiments show that the present method works well on buffer overflow validation and false alarm reduction. According to some embodiments, however, there are limitations. The present method reduces 60% of the buffer overflow warnings reported by Fortify, but there are still a lot of undecided ones. By analyzing the undecided cases, according to some embodiments, three main reasons are discovered.

According to some embodiments, first, the constraint solver may not be able to finish within a reasonable amount of time because the path conditions and overflow conditions are too complex. According to some embodiments, second, a warning point may not be reachable by the symbolic execution engine due to unknown library calls. When an execution path contains a library call that the symbolic execution engine does not have the source code, the symbolic execution engine terminates the execution path as it cannot explore further. According to some embodiments, third, a warning point may not be reachable by the symbolic execution engine within a reasonable amount of time due to path explosion within known library calls. When an execution path contains a library call that the symbolic execution engine does have the source code, the symbolic execution engine enters the library call and explore all execution paths, which can grow exponentially with the number of branches. According to some embodiments, BovInspector does not have path explosion issues for the source code outside of known library calls because of the present path pruning technique based on warning paths.

According to some embodiments, because there is limitation in KLEE for accessing some parameters during the symbolic execution, some buffer operations in Table II are

TABLE V

REPAIR RESULT ON REAL PROGRAMS

| Program | BOFPos | BOFCause | Fortify (before) | BovInspector | Fortify (after) Boundary Checking | Fortify (after) API-Replacement |
|---|---|---|---|---|---|---|
| gzip-1.2.4 | gzip.c:1009 | strepy | BOF | BOF | Dangerous Function | Nothing |
| wwwcount-2.3 | main.c:346 | strepy | BOF | BOF | Dangerous Function | Nothing |
| net-tool-1.6 | netstat.c:450 | streat | BOF | BOF | Nothing | Nothing |
| net-tool-1.6 | netstat.c:457 | streat | BOF | BOF | Nothing | Nothing |
| net-tool-1.6 | netstat.c:602 | streat | BOF | BOF | Nothing | Nothing |
| net-tool-1.6 | netstat.c:608 | streat | BOF | BOF | Nothing | Nothing |
| net-tool-1.6 | netstat.c:737 | streat | BOF | BOF | Nothing | Nothing |
| net-tool-1.6 | netstat.c:743 | streat | BOF | BOF | Nothing | Nothing |

The column 'Program' indicates the program we choose for repair, the column 'BOFPos' lists the source code file and the line numbers of the buffer overflows, and the column 'BOFCause' shows the operations that trigger the buffer overflow problem. From the column 'Fortify(before)' and 'BovInspector', it is observed that all the buffer overflow warnings are validated as true buffer overflow. The column 'Fortify(after)' includes two sub-columns which list the Fortify results for the repaired source code with mode not supported in BovInspector, however, over 90% of the operations can be accessed by our tool. According to some embodiments, the present method relies on the ability of static analysis tool. Some buffer overflow vulnerabilities may be missed by static analysis tool, which means that they are out the scope of the present approach.

According to some embodiments, a system for automatic buffer overflow warning inspection and bug repair is disclosed. The system includes a first module for warning reachability analysis, the first module accepts static overflow warnings and source code as an input, the first module is functionally connected to the second and the third modules, and sends out a warning path set as an output. The system also includes a second module for guided symbolic execution, the second module is functionally connected to the first module and the third module. The system further includes a third module for buffer overflow validation, the third module is functionally connected to the first, the second and the four modules and sends out undecided warnings and false warnings as output. The system further includes a fourth module for targeted automatic repair, the fourth module is functionally connected to the third module and sends out true warnings as output.

According to some embodiments, a method for warning reachability analysis is disclosed. The method includes the steps of performing static analysis on the source code to generate software vulnerability warnings, generating the Inter-procedural Control Flow Graph, calculating all complete execution paths, wherein the complete execution paths start from the program entrance, end at the warning point and contain the path segment, and outputting a warning path set.

According to some embodiments, a method for guided symbolic execution is disclosed. The method includes the steps of interpreting a branch instruction, pruning the path after symbolic execution, checking whether the execution states match the warning paths, for the condition that both statement labels of the instructions in the two execution states are contained in a path set, not removing the path and for the condition that both statement labels of the instructions in the two execution states are not contained in a path set, removing the path.

According to some embodiments, a method for buffer overflow validation is disclosed. The method includes monitoring symbolic execution, constructing overflowable path constraints, solving constraints and classifying buffer overflow warnings.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for automatic buffer overflow warning inspection and bug repair, the system comprising:
   a memory that stores computer executable components; and
   a processor that executes the computer executable components stored in the memory, wherein the computer executable components comprise:
   a first module for warning reachability analysis,
   a second module for guided symbolic execution,
   a third module for buffer overflow validation, and
   a fourth module for targeted automatic repair, wherein
      the first module accepts static overflow warnings and source code as an input, is functionally connected to the second and the third modules, and sends out a warning path set as an output, wherein the warning path set includes a set of warning paths each of which starts from a program entrance and ends at a warning point corresponding to the warning path set,
      the second module is functionally connected to the first module and the third module, and is configured for:
         interpreting a branch instruction for a branch traveled by an execution path,
         pruning the execution path after symbolic execution, and
         checking whether execution states match the warning paths in the warning path set, by determining whether statement labels of the branch instruction in the execution states are contained in the warning path set,
      the third module is functionally connected to the first, the second and the fourth modules and sends out undecided warnings and false warnings as an output, and is configured for:
         solving overflowable path constraints with respect to the warning point corresponding to the warning path set, and
         classifying the warning point as one selected from a group including: a true warning, a false warning, and an undecided warning, based on whether a solution is found within a time limit to satisfy the overflowable path constraints such that a test case exists based on the solution to trigger buffer overflow at the warning point,
         wherein under a determination that the third module cannot determine within the time limit whether a solution exists to satisfy the overflowable path constraints, the warning point is classified as an undecided warning that is reported by the third module, and
      the fourth module is functionally connected to the third module and sends out true warnings as an output.

2. The system of claim 1, wherein the first module is configured for performing static analysis on the source code to generate software vulnerability warnings.

3. The system of claim 1, wherein the first module is configured for generating an Inter-procedural Control Flow Graph based on the source code.

4. The system of claim 3, wherein the first module is further configured for calculating, for each path segment of the warning point, all complete execution paths which start from the program entrance, end at the warning point and contain the path segment, by performing backward tracking on the Inter-procedural Control Flow Graph.

5. The system of claim 1, wherein the first module is configured for outputting the warning path set.

6. The system of claim 1, wherein the third module is further configured for monitoring symbolic execution.

7. The system of claim 1, wherein the third module is further configured for constructing the overflowable path constraints.

8. The system of claim 1, wherein:
   the overflowable path constraints comprise at least one condition the warning paths need to satisfy and at least one condition for triggering buffer overflow at the warning point.

9. The system of claim 1, wherein:
   under a determination that a solution is found within the time limit to satisfy the overflowable path constraints, the warning point is classified as a true warning.

10. The system of claim 1, wherein:
under a determination that no solution exists to satisfy the overflowable path constraints, the warning point is classified as a false warning.

11. The system of claim 1, wherein:
the third module cannot determine within the time limit whether a solution exists to satisfy the overflowable path constraints, because path conditions and overflow conditions included in the overflowable path constraints are too complicated.

12. The system of claim 1, wherein:
the third module cannot determine within the time limit whether a solution exists to satisfy the overflowable path constraints, because the warning point is not reachable within the time limit by the second module due to unknown library calls.

13. The system of claim 1, wherein:
the third module cannot determine within the time limit whether a solution exists to satisfy the overflowable path constraints, because the warning point is not reachable within the time limit by the second module due to path explosion within known library calls.

* * * * *